United States Patent [19]
Kelley et al.

[11] 4,189,261
[45] Feb. 19, 1980

[54] SINGLE LINE PNEUMATIC TUBE SYSTEM

[75] Inventors: Charles K. Kelley; William W. Jones, both of Houston, Tex.

[73] Assignee: Charles K. Kelley and Sons, Inc., Houston, Tex.

[21] Appl. No.: 876,112

[22] Filed: Feb. 8, 1978

[51] Int. Cl.² .............................................. B65G 51/26
[52] U.S. Cl. .................................... 406/112; 137/874
[58] Field of Search ...................... 243/1, 2, 19, 20, 24, 243/28, 38; 137/874, 625.2, 625.21, 625.44

[56] References Cited
U.S. PATENT DOCUMENTS

| | | | |
|---|---|---|---|
| 2,698,721 | 1/1955 | Van Otteren | 243/2 |
| 3,232,559 | 2/1966 | Grosswiller et al. | 243/2 |
| 3,998,405 | 12/1976 | Carlier | 243/19 |

Primary Examiner—Jeffrey V. Nase
Attorney, Agent, or Firm—James C. Wray

[57] ABSTRACT

A single line (pressure-vacuum) pneumatic tube system capable of incorporating one or more novel intermediate stations. A unique pressure-vacuum chamber and a novel air shifter valve in the central station provides either pressure or vacuum for the system without turbulence or significant pressure drop. An air relief valve in the tubing significantly reduces noise at the end station. The end station is provided with a valve for return air. The system is unitized eliminating custom design of simple systems.

14 Claims, 8 Drawing Figures

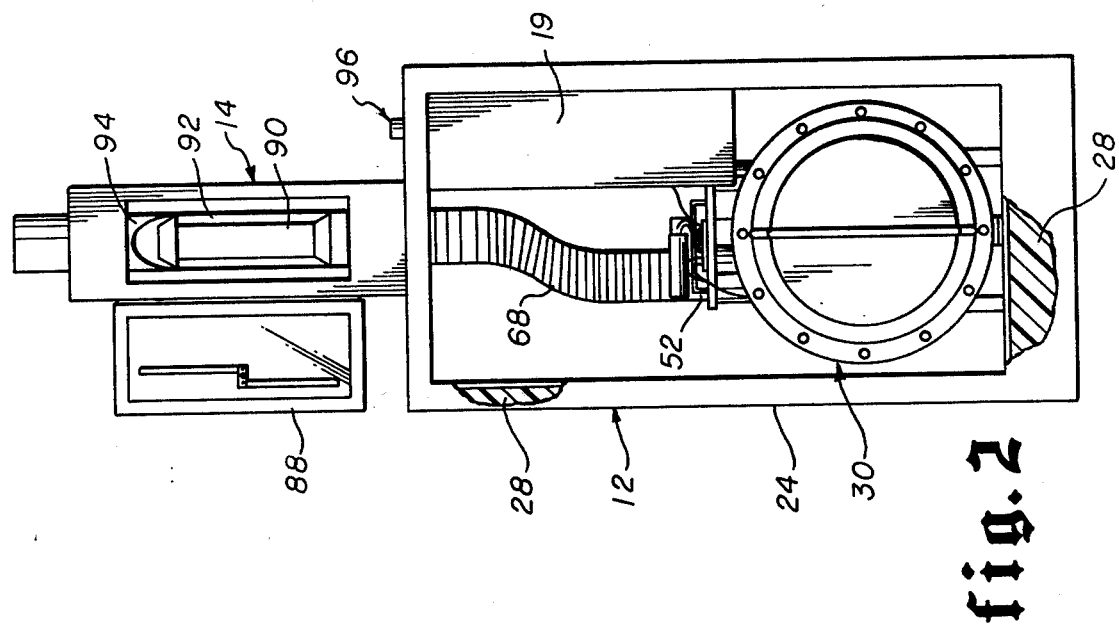
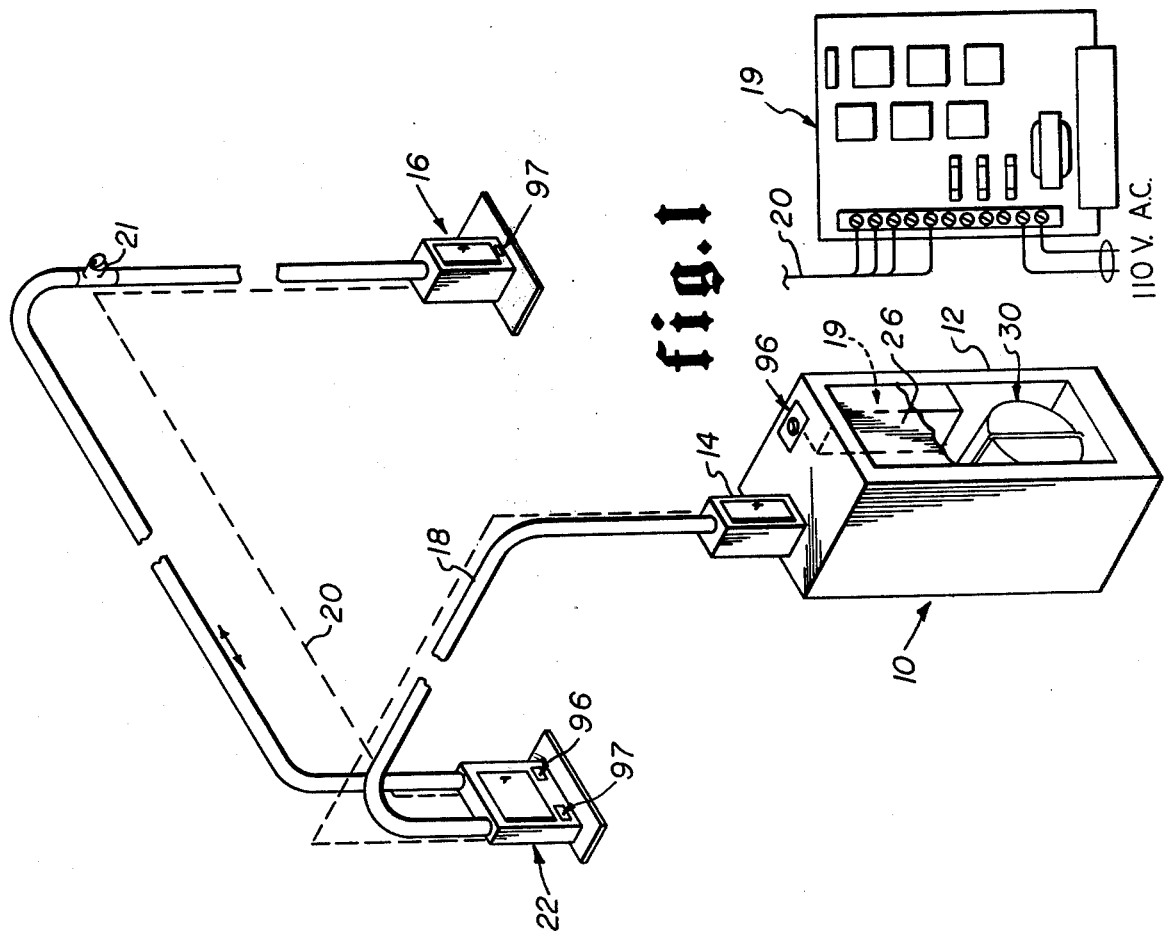

SINGLE LINE PNEUMATIC TUBE SYSTEM

BACKGROUND OF THE INVENTION

This invention relates to a unitized single line (pressure-vacuum) pneumatic tube system capable of incorporating intermediate stations, and novel components therefor.

Traditionally, pneumatic tube systems which deliver carriers to one or several locations and back have been custom designed, requiring extensive engineering and selection of various components. Single line pneumatic tube systems are well known in the prior art as exemplified by U.S. Pat. Nos. 2,137,750 and 3,232,559 and are utlized for drive-in banking and tolls as shown in U.S. Pat. Nos. 3,599,898 and 3,976,264. Such systems normally use a high powered turbine to provide the necessary air; however, the noise level of the turbine is such that the turbines are located at a remote location from the terminals. Moreover, the air shifter valve for such a system is usually complicated and changes the direction of flow causing turbulence. Although some single line systems do use smaller blowers, they require a blower at each terminal location.

Accordingly, a need has existed for a unitized system which can be packaged and sold by the manufacturer as a complete system eliminating custom design. Also, there is a need for a simple single line pneumatic tube system having a single power unit which is sufficiently quiet that it can be installed in a room where people are working. There is also a need for an air shifter which eliminates changing direction of the air. Further, there is a need for a single line pneumatic tube system which has a minimum of noise at the end terminal and which can include intermediate terminals which can transmit a carrier in either direction without complicated valving.

SUMMARY OF THE INVENTION

The single line pneumatic tube system of the present invention is comprised basically of a central station, including a power unit and a central terminal; an end terminal; tubing connecting the terminals; and low voltage wiring. Intermediate terminals capable of transmitting a carrier in either direction may be included. The power unit includes a pressure-vacuum chamber formed of a housing having a partition plate dividing the housing into two sealed chambers. One or more through flow blowers extend through the plate. The pressure-vacuum chamber has two spaced ports. Mounted on the ports is a novel air shifter valve connected by a length of flexible tubing to the central terminal. The valve has a motor driven angularly reciprocating plate connecting the flexible tubing to either the pressure or vacuum port of the pressure-vacuum chamber. Acoustical insulation in the chamber and housing reduce noise so that the central station may be located where personnel are working. To eliminate noise at the end terminal, the tubing remotely from the end terminal has a flapper valve which allows escape of the air permitting a negative drop to the terminal. The end terminal is provided with an automatic valve providing air during vacuum operation. Each terminal is provided with a guide to facilitate ease of initiating carrier transmission.

BRIEF DESCRIPTION OF THE DRAWINGS

A preferred embodiment of the invention—illustrative of the best mode in which applicants have contemplated applying the principles—is set forth in the following description and shown in the drawings, and is particularly and distinctly pointed out and set forth in the appended claims.

FIG. 1 is a general diagrammatic view showing the novel single tube pneumatic system of the present invention having one intermediate station.

FIG. 2 is a front elevational view of the central station and power unit with the front cover of the power unit removed and the door of the central station open.

DESCRIPTION OF THE PREFERRED EMBODIMENT

Figure 3:
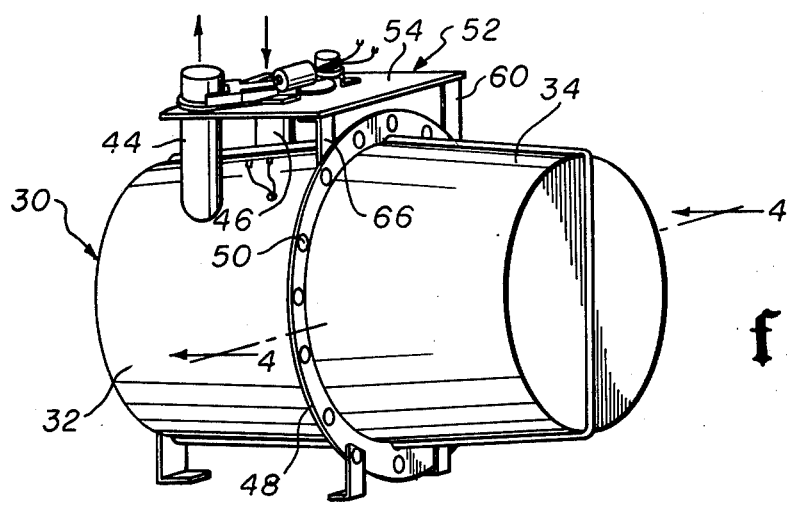
FIG. 3 is an isometric view of the pressure-vacuum chamber and air shifter valve.

As can be seen in FIG. 1, the basic single line pneumatic tube system of the present invention is comprised of a central station 10 which includes a power unit 12, and a central terminal 14, an end terminal 16, and tubing 18 connecting the terminals. The electronics 19 are located in the power unit and low voltage wiring 20 provides electrical connection between terminals. The tubing remote from the end terminal is provided with a flapper air relief valve 21 which will automatically exhaust air after a carrier has passed the air relief valve and therefore there is no air exhaust at the end terminal and practically no noise to disturb personnel in the area. If desired one or more intermediate terminals 22 may be incorporated into the system. The system is so designed that it may be packaged and sold by a manufacturer as a complete system eliminating custom design.

Figure 4:
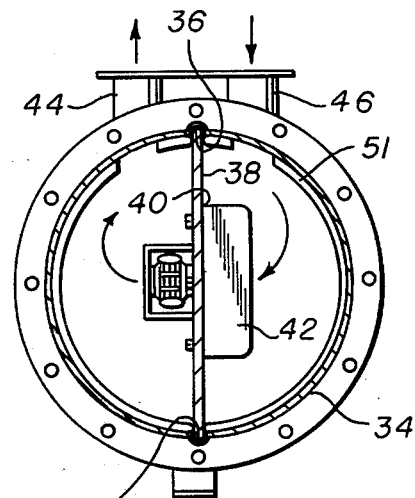
FIG. 4 is a cross sectional view taken along lines 4—4 of FIG. 3.

The central station is so designed that it resembles office furniture with the noise level being sufficiently low that it will not disturb normal office operations. The central station containing power unit 12 is the heart of the system replacing the high noise level turbine traditionally used to produce the air for the system. Moreover, the power unit 12 provides both pressure and vacuum for the entire system. The power unit 12 is formed of a rectangular sheet metal housing 24 having a removable front panel 26. All six interior sides of the housing are provided with acoustical padding 28, which may be sheets of polyester. A pressure-vacuum chamber 30 located in power unit 12 provides both pressure and vacuum, see FIG. 3. The chamber 30 is formed of two rimmed truncated cone housings 32-34 which may be vacuum formed ABS. Each housing member has diametrically opposed longitudinally extending grooves 36—36. As seen in FIG. 4, a central partition plate 38 is located in grooves 36—36. Partition 38 has at least one motor aperture 40 in which is mounted a flow through blower 42. The partition 38 is sealed in the grooves and the motor is sealed in the aperture so that when the chamber is assembled there is a pressure side and vacuum side. It has been found that Lamb Vacuum Motor, Model 115750 having a 2" orifice operates very satisfactorily producing a volume of approximately 110 cfm and a vacuum of 3.4 (inches $H_2O$). The number of motors mounted in the partition 38 will depend upon the size of the system. It has been found that one motor is sufficient for a 2½" or a 3" system, two motors for a 4" or 4½" system and three motors for a 4"×7" system delivering carriers at a speed of approximately twenty five feet per second. Accordingly, partition 38 will have the requisite number of apertures for the system. Front housing member 32 is provided with a pressure port 44 and a vacuum port 46 which are in communication with the pressure and vacuum side of the chamber respectively. The rims 48 of the housing members are provided with apertures and secured together by fasteners 50. To cut down on noise, the inside of the chamber is provided with a layer of acoustical padding 51 which may be sheet polyester. Thus pressure-vacuum chamber provides both air pressure to move a carrier from the central terminal to a remote terminal and vacuum to return the carrier from a remote terminal to the central terminal.

Figure 5:
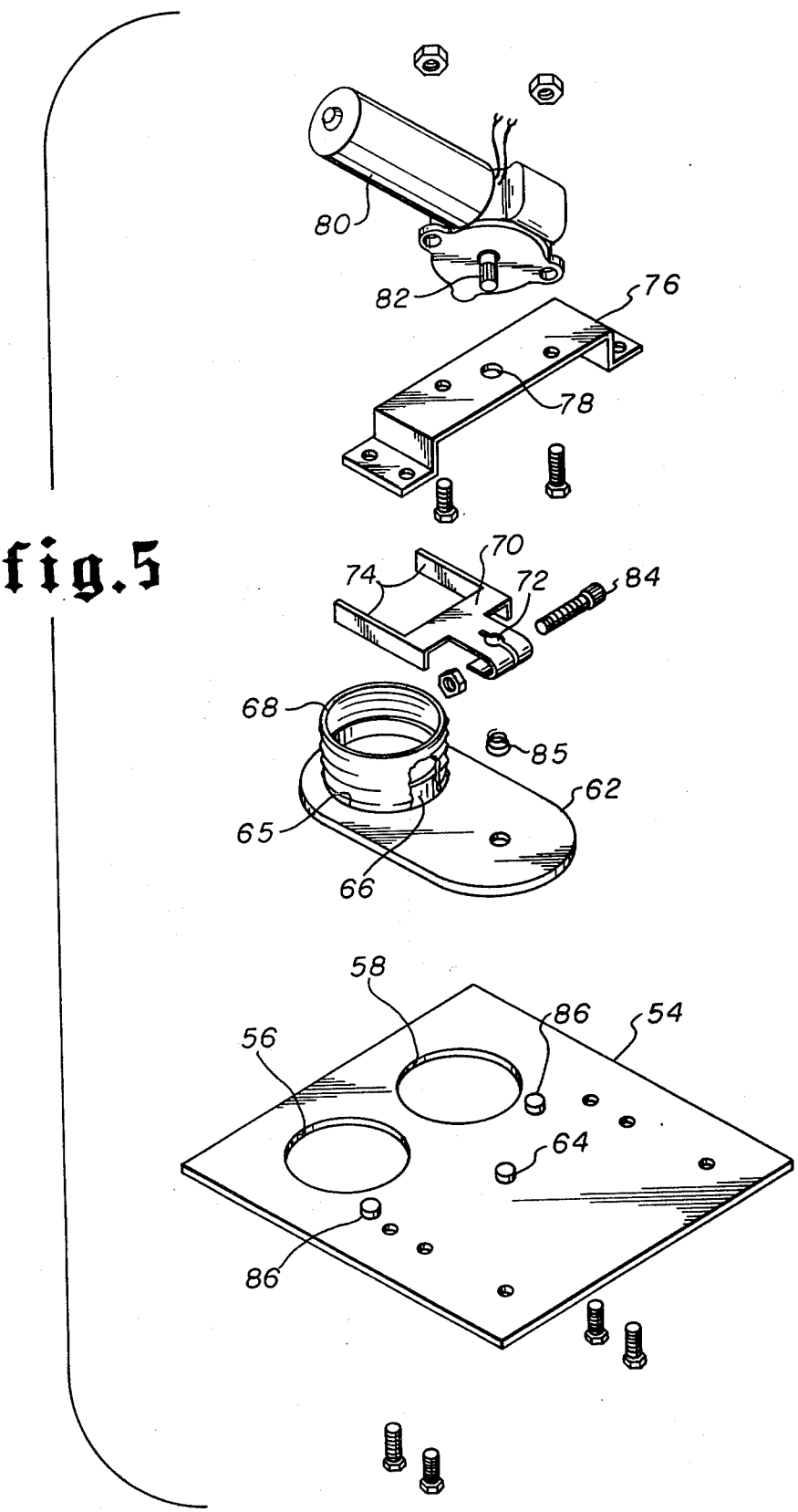
FIG. 5 is an exploded view of the air shifter valve.

To shift operation from pressure to vacuum an air shifter valve 52 shown in exploded relation in FIG. 5 is connected to pressure and vacuum ports 44-46. The air shifter valve is formed of a base plate 54 which has ports 56-58 which are sealingly attached to pressure and vacuum ports 44-46. The base plate may be secured to the pressure vacuum chamber by brackets 60 which are attached to the rim of the pressure-vacuum chamber. Positioned on top of the base plate 54, is a pivotable member 62 which is pivoted at one end about a stud 64 extending up from the base plate 54. The other end of pivotable member 62 is provided with a port 65 for registry with one of the ports 56-58 in the base plate. An upstanding portion 66 surrounds the port 65. A flexible tubing 68 is attached to the portion 66 and extends up to and attaches with the inlet of central terminal 14. To move pivotable member 62 from registry with pressure port 56 to registry with vacuum port 58 and visa versa, there is a pivotable fork member 70 which has a pivot slot 72 concentric with the stud 64 and bifurcated arms 74—74 which surround the upstanding portion 66. A bridge member 76 having an aperture 78 over lying pivot stud 64 is attached to base plate 54. Attached to bridge member 76, there is a drive motor 80 having a drive shaft 82 which extends through aperture 78 and pivot slot 72 and is attached to fork 70 by connecting means 84. It has been found that Model MO 581315A by American Bosch Arms Corporation will provide the proper actuation, 60° reciprocation. To assure proper registry, the base plate 54 is provided with stops 86—86. To prevent strain on drive motor 80 during start up and stopping, ports 56-58 may be placed so that the included angle from the pivot point to the centers of the ports 56-58 is 57° with the arms 74—74 of fork 70 slightly wider than the upstanding portion 66. Therefore, there will be some play at each end of travel. To maintain the pivotable plate in contact with the base plate 54 a spring member 85 is positioned between the end of the shaft 82 and the pivotable member 62.

As set forth above, the central terminal 14 is located on top of the power unit 12 and is provided with pressure or vacuum from the pressure-vacuum chamber 30 by the air shifter valve 52 through flexible tubing 68. The central terminal 14 is provided with a door 88 for inserting or removing a carrier 90. The terminal 14 is also provided with a guide 92 terminating at its top end in a full round section of tubing 94. To start operation, the carrier is inserted into guide 92 with the felt of the carrier in contact with tubing section 94. The door 88 is then closed which seals the system.

Figure 8:
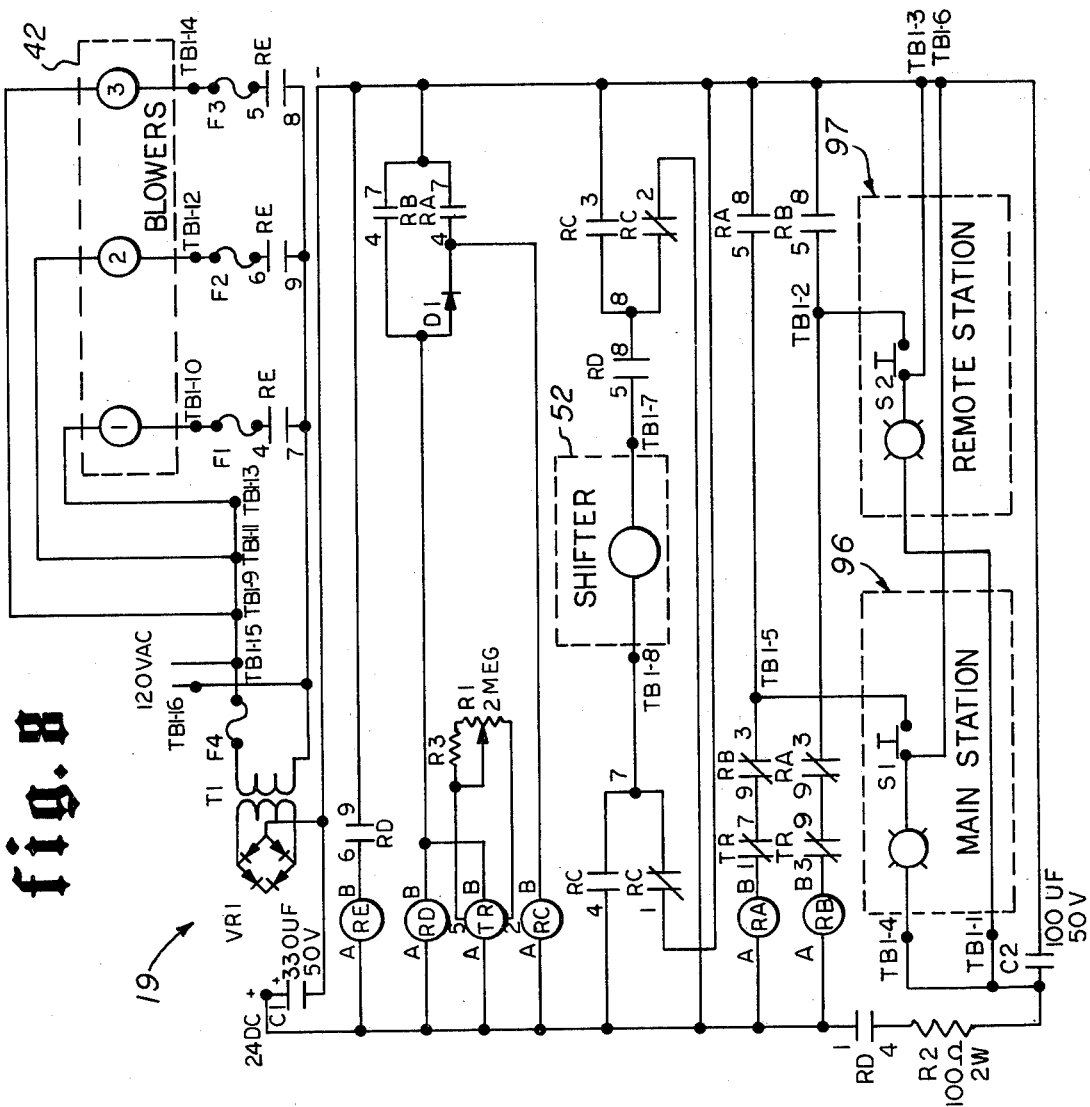
FIG. 8 is a schematic of master electrical control panel.

Electrical power for the entire system is provided by attaching an electrical cable provided with a male plug to a 120 volt alternating current outlet thereby eliminating the necessity of special electrical wiring. The blowers 42 run on 120 vac. All other components including the motor for the air shifter valve operate on 24 volt direct current. FIG. 8 is a schematic of the electronics 19 which are of the plug in type located on a panel in the power unit, see FIG. 1. Each terminal is provided with a push button switch which is illuminated when on. The switch for pressure operation is labeled 96 and the one for vacuum operation 97. Engagement of any switch commences operation of the system. As can be seen in FIG. 8, engagement of push button 96 illuminates the lights to show the system is in operation. It also allows current to flow to relay RA energizing it and closing normally open contacts RA. This allows current to flow to relay RC energizing it and thereby closing normally open contacts RC and opening normally closed contacts RC. Current also flows to timer TR and relay RD which closes normally open contacts RD permitting current to flow to relay RE energizing it and contacts RE which commences operation of blowers 42. At the same time, drive motor 80 of air shifter valve 52 is energized, moving pivotable member 62 to a position where port 65 is in registry with pressure port 44 and air from the pressure side of pressure-vacuum chamber 30 is provided through flexible tubing 68 to the inlet of central terminal 14 causing the carrier to travel through tubing 18 to the next terminal. The system is powered so that the carrier will travel at approximately twenty five feet per second. The timer TR may be adjusted from 8 seconds to 180 seconds. After the set period, the timer relay will open the contacts TR cutting off the flow of low voltage power and shutting off the system. If switch 97 is energized, similar operations will take place except that air shifter valve 52 will move the pivotable member 62 to the position where port 65 will be in registry with the vacuum port 46.

Figure 7:
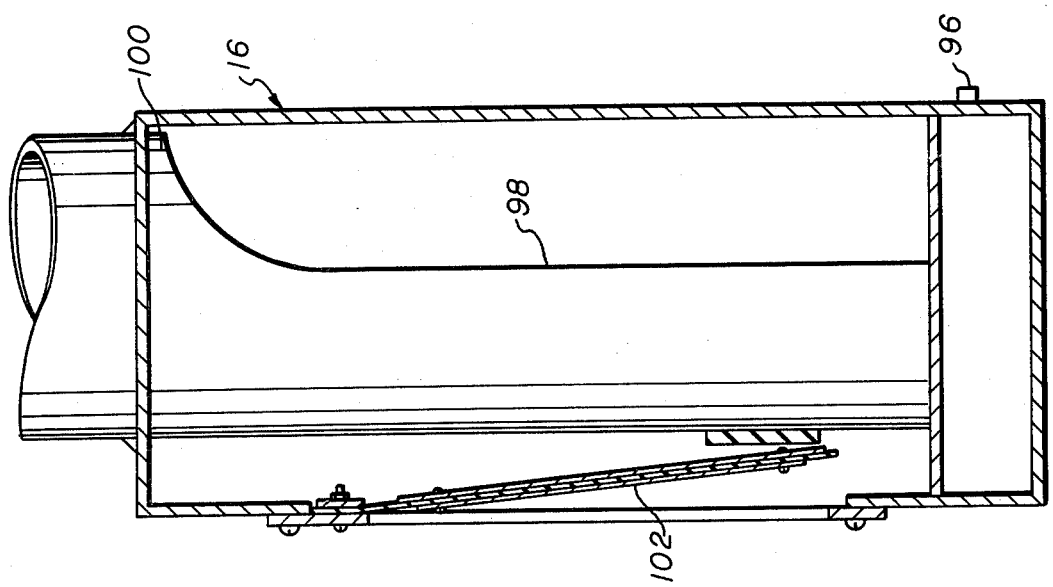
FIG. 7 is a cross sectional side view of the end terminal with the valve open for vacuum operation.

As previously mentioned, there is an air relief valve 21 located in the vertical run of tubing remotely spaced from end terminal 16. After the carrier passes this point, air will flow through the relief valve and the carrier will free fall to the end terminal. Therefore, escape of air pressure occurs away from the end terminal and operation is quiet. As can be seen in FIG. 7, the end terminal 16 is provided with a guide 98 similar to guide 92 of the central terminal. Guide 98 has a section of tubing 100 for insertion of the carrier into the system. Also, the bottom of the end terminal is provided with shock absorbing padding. End terminal 16 also is provided with a flap valve 102 which is closed during pressure operation but which automatically opens during vacuum operation to provide air behind the carrier.

Figure 6:
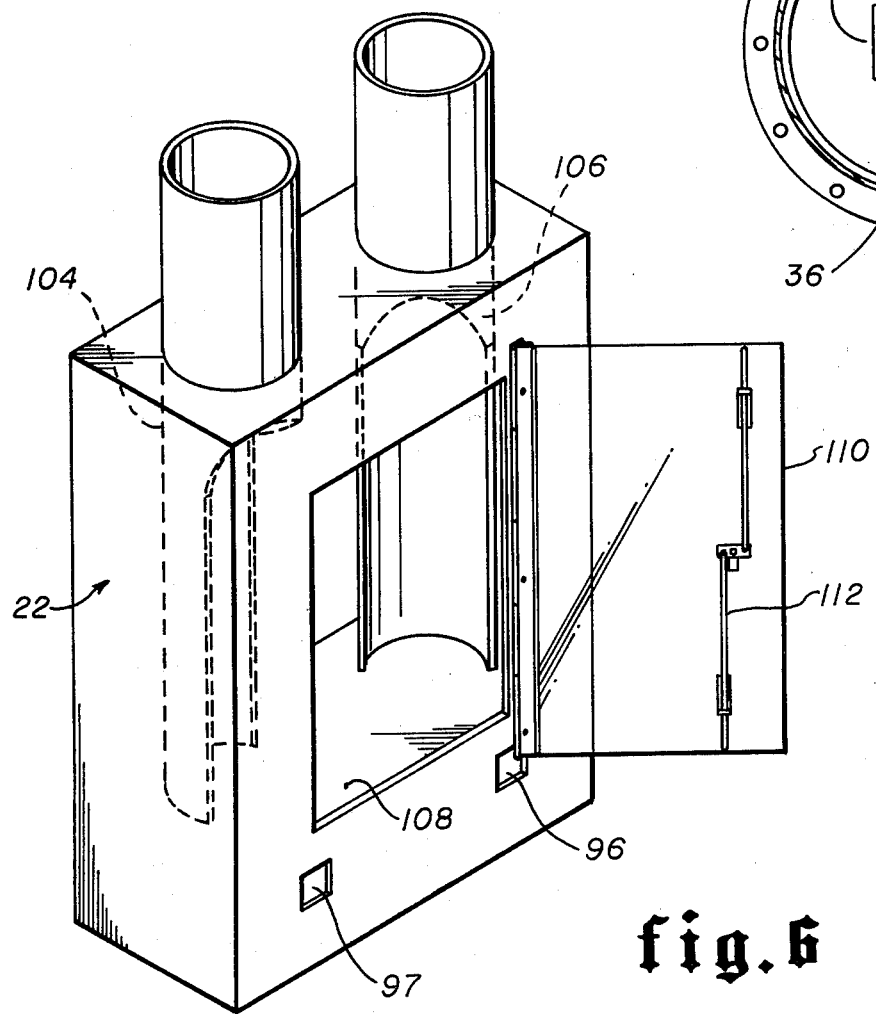
FIG. 6 is an isometric view of the intermediate terminal.

In addition to central terminal 14 and end terminal 16, the system may include one or more intermediate terminals 22. As can be seen in FIG. 6, the intermediate terminal is provided with two spaced facing guides 104—104 each of which has an opening portion facing the other. The guides similar to the guides of the other terminals have a portion of full tubing 106 for insertion of the carrier into the system. The intermediate terminal has a cushion 108 of shock absorbing material to absorb the shock of the carrier. The guides 104—104 are spaced a sufficient distance from the bottom of the terminal so that air may pass around the carrier after the carrier is in the terminal. The intermediate terminal is so designed that it will receive and transmit carriers from either direction. Accordingly, intermediate terminal 22 is provided with switch 96 to provide pressure operation to forward a carrier to end terminal 16 or another intermediate terminal. Terminal 22 is also provided with switch 97 to commence vacuum operation to return a carrier to the central terminal or an intermediate terminal located between the central terminal and intermediate terminal. Intermediate terminal 22 has a door 110 for removing or inserting a carrier. As can be seen in FIG. 6, the door 110 has a latch 112 which makes three point contact with the inside of the front panel to assure full closure. Door 88 of central terminal 14 is provided with similar latch. The latches provide positive closure for an air tight system.

As can be seen from the foregoing, the pneumatic tube system of the present invention is so designed that it may be packaged as a unit and easily installed. The central station includes the power unit and central terminal and the only electrical connection is attachment to a normal 120 volt alternating current outlet. Both pressure and vacuum is provided by the novel pressure-vacuum chamber that is powered by small flow through blowers. The system is shifted from pressure to vacuum by the novel air shifter valve which does not require changing of direction and subsequent turbulence. Intermediate terminals may be incorporated into the system and carriers may be received and transmitted in either direction from the intermediate terminal. To provide quiet operation at the end terminal, an air relief valve is located in the tubing remotely spaced from the end terminal. To provide air in back of the carrier during vacuum operation, the end terminal has a flapper valve which automatically opens during vacuum operation.

What is claimed is:

1. A single line pneumatic tube system comprising: a self-contained main station and power unit formed of an acoustically insulated housing having a central terminal mounted thereon, said power unit including in the housing a pressure-vacuum chamber having a pressure port and a vacuum port, an air shifter valve connected to the ports, and a flexible tubing attached to the air shifter valve and to the terminal for selectively providing pressure or vacuum to the terminal, electronic control means to energize the system and shift the shifter valve to the proper mode for transmission of the carrier, and means extending from the housing to connect the unit to normal 120 V A.C. service, an end terminal, switch means in the end terminal connected to the control means by low voltage wiring, and tubing connecting the central terminal to the end terminal, means in the tubing remote from the end terminal permitting the exhausting of air whereby a carrier free falls into the end terminal during pressure operation, the end terminal having a valve normally biased closed for pressure operation and automatically opening for vacuum operation.

2. The pneumatic tube system specified in claim 1 wherein at least one intermediate terminal is incorporated between the central terminal and the end terminal, the intermediate terminal having means to actuate the system for travel of the carrier to the desired location.

3. The pneumatic tube system specified in claim 2 wherein the intermediate station is formed of a housing having two ports, each port having a guide portion extending into the housing terminating above the bottom of the terminal a sufficient distance so that air will flow around the carrier, a cushion at the bottom of the terminal to absorb the shock, the guide portion having solid tubing extending downward into the terminal to facilitate insertion of the carrier for transmission, the terminal being capable of receiving and sending carriers in either direction.

4. The pneumatic tube system specified in claim 1 wherein the pressure-vacuum chamber is formed of a housing having a central plate dividing the housing into two sealed chambers, at least one flow through blower sealingly mounted in the plate, a port for each of the chambers.

5. A single line pneumatic tube system comprising a power unit having a central terminal, said power unit including a pressure-vacuum chamber having a pressure port and a vacuum port, and an air air shifter valve connected to the ports and to the terminal selectively providing pressure or vacuum to the terminal; an end terminal; tubing connecting the central terminal to the end terminal, means in the tubing remote from the end terminal permitting the exhausting of air whereby a carrier free falls into the end terminal during pressure operation, the end terminal having a valve normally biased closed for pressure operation and automatically opening for vacuum operation; and electronic means to energize the system and shift the air shifter valve to the proper mode for transmission of the carrier, wherein the air shifter valve is formed of a base plate having two ports, the ports sealingly engaged with the ports of the pressure-vacuum chamber, a pivotable plate having a port with means for receiving a flexible tubing, a pivotable bifurcated fork, the arms of the pivotable fork contacting the flexible tubing receiving means, angularly reciprocating means driving the fork to move the pivotable plate into communication with one or the other of the ports in the base plate.

6. The pneumatic tube system specified in claim 5 including an intermediate terminal between the central terminal and the end terminal said intermediate terminal comprising a housing having two ports, each port having a guide portion extending into the housing and terminating above the bottom of the intermediate terminal, so that air will flow around the carrier, the guide portion having full tubing to facilitate insertion of the carrier for transmission, the intermediate terminal receiving and transmitting carriers in either direction.

7. The pneumatic tube system specified in claim 6 wherein the intermediate terminal includes a cushion at the bottom of the intermediate terminal to absorb shock.

8. The pneumatic tube system specied in claim 5 wherein said pressure-vacuum chamber comprises a housing having a partition plate dividing the housing into two chambers, at least one flow through blower mounted in the partition plate, each chamber being connected to one of said ports.

9. The pneumatic tube system specified in claim 8 wherein the housing is formed of vacuum formed plastic members having rims and longitudinal grooves, the partition plate being located in the grooves and means for attaching the rim of the two members together.

10. An air shifter valve for a pneumatic tube system having a power unit with spaced pressure and vacuum ports, said valve comprising a pivotable member pivoted at one end and having at its other end a port, registrable with either the pressure port or the vacuum port, the pivotable member having a flexible tubing attaching means, a bifurcated fork having a pivot point concentric with the pivot point of the pivotable member, the arms of the fork adapted for contact with the flexible tubing attaching means of the pivotable member, a drive means for moving the fork; whereby the port of the pivotable member moves into registry with either the pressure or vacuum port to provide pressure or vacuum.

11. The air shifter valve specified in claim 10 wherein stops are provided for proper registry of the port in the pivotable member with the pressure and vacuum ports.

12. The air shifter valve specified in claim 11 wherein the pivotable member is mounted on a base plate having ports sealingly engaged with the pressure and vacuum port.

13. The air shifter valve specified in claim 12 wherein the means for moving the fork comprises an electrical drive motor mounted on a bridge member attached to the base plate, the drive motor having a shaft concentric with the pivot point of the pivotable member and attached to the fork, the rotation of the drive shaft being such as to move the port of the pivotable member into registry with the pressure or vacuum port.

14. The air shifter valve specified in claim 12 wherein there are means to maintain the pivotable member in contact with the base plate.

* * * * *